United States Patent
Yamazaki et al.

(10) Patent No.: US 7,993,563 B2
(45) Date of Patent: Aug. 9, 2011

(54) PRODUCTION METHOD OF WOOD CEMENT BOARD

(75) Inventors: Yuji Yamazaki, Chita (JP); Masaya Higuchi, Nagoya (JP); Yoshinori Hibino, Ama-gun (JP)

(73) Assignee: Nichiha Corporation, Nagoya-Shi (JP)

( * ) Notice: Subject to any disclaimer, the term of this patent is extended or adjusted under 35 U.S.C. 154(b) by 297 days.

(21) Appl. No.: 12/414,277

(22) Filed: Mar. 30, 2009

(65) Prior Publication Data

US 2009/0243149 A1 Oct. 1, 2009

(30) Foreign Application Priority Data

Mar. 31, 2008 (JP) ................................ 2008-092316

(51) Int. Cl.
*B28B 3/12* (2006.01)

(52) U.S. Cl. ........ 264/256; 264/113; 264/119; 264/120; 264/333; 52/630

(58) Field of Classification Search ................... None
See application file for complete search history.

(56) References Cited

U.S. PATENT DOCUMENTS 5,169,573 A * 12/1992 Tsuchida et al. ................. 264/35
6,886,304 B1 * 5/2005 Godi et al. ....................... 52/612

FOREIGN PATENT DOCUMENTS

JP 2001-150421 A 6/2001

* cited by examiner

*Primary Examiner* — Mary Lynn F Theisen
(74) *Attorney, Agent, or Firm* — Birch, Stewart, Kolasch & Birch, LLP (57) ABSTRACT

Provided is a high manufacturing method of the production efficiency for a wood cement board that has a pattern of recesses and projections.

The method for making a wood cement board having a pattern of recesses and projections on its surface, comprising: dispersing a raw material mixture onto a template provided with recesses corresponding to the portions of the wood cement board on which projections are formed, while conveying the template, thereby forming a mat; pressurizing only a section of the mat raw material mixture that is layered on the recesses of the template from above; leveling the surface of the partly pressurized mat; and pressing the resulting mat and the template together, followed by hardening and curing.

4 Claims, 7 Drawing Sheets

Press and cure

Press and cure

Press and cure

Press and cure

Press and cure

Press and cure

FIG. 7

PRODUCTION METHOD OF WOOD CEMENT BOARD

BACKGROUND OF THE INVENTION

1. Field of the Invention

The present invention relates to a production method of wood cement board that has a pattern of recesses and projections on its surface.

2. Description of Related Art

Wood cement boards are produced by forming a mat using a raw material mixture in which a hydraulic material, a silica-containing material, a wood reinforcement, and as needed, other materials are blended, and then pressing the mat, followed by hardening and curing. Such wood cement boards are widely used as housing members such as exterior building materials and backing materials of tiles. Various patterns formed by recesses and projections, such as a brick pattern and joint grooves, are created on the surface of wood cement boards for use as exterior building materials in order to achieve an improved appearance.

Recently, for a further improved surface design, there is a demand for acute-angled and deep recesses and projections.

Wood cement boards for use as backing materials for tiles need to be provided with fixing portions formed by acute-angled and deep recesses and projections on their surface for securing the tiles.

Wood cement boards are produced by forming a mat using a raw material mixture in which a hydraulic material, a silica-containing material, a wood reinforcement, and as needed, other materials are blended, and then pressing the mat, followed by hardening and curing.

According to this aspect of the present invention, the hydraulic material may be cement such as portland cement, blast furnace cement, silica cement, fly ash cement, or alumina cement, the silica-containing material of the invention may be silica sand, silica stone powder, silica fume, blast furnace slag, fly ash, shirasu balloon, pearlite, or the like. In an existing situation of water, the silica-containing material stiffens with the cement by hydration reaction.

And the wood reinforcement of the invention may be wood meal, wood fiber, pulp, wood fiber bundle, wood wool, wood chip, bamboo fiber, hemp fiber, or the like.

The bulky wood fiber bundle that is branched and/or curved and/or bended is particularly desirable.

In addition to the above-described raw materials, it is possible to include, as raw materials, an active lime-containing material such as gypsum dihydrate, gypsum hemihydrate, anhydrous gypsum, hydrated lime, or quick lime, a hardening accelerator such as magnesium chloride, calcium formate, magnesium sulfate, calcium chloride, calcium sulfate, sodium aluminate, potassium aluminate, aluminum sulfate, or water glass, mineral powder such as vermiculite, bentonite, wollastonite, or attapulgite, a water repellent agent such as wax, paraffin, or silicone, a reinforcement such as synthetic resin emulsion, as well as foamable thermoplastic bead, and foamed plastic.

Examples of the method for forming recesses and projections on the surface of a wood cement board include a method in which an embossing roll having an engraved pattern of recesses and projections is rolled on the surface of a half-hardened mat that has not been pressed, while applying pressure, thereby forming the desired pattern of recesses and projections on the surface, a method in which the surface of a wood cement board that has undergone a hardening and curing process is subjected to cutting such that a pattern of recesses and projections is formed on its surface, and a method in which a template having a pattern of recesses and projections is placed on the surface of a mat that has not been pressed, followed by pressing the mat together with the template.

However, with the method using an embossing roll, it is difficult to form acute-angled and deep recess and projection shapes.

The method in which the surface of a wood cement board is subjected to cutting requires a cutting process, and therefore involves additional equipment cost and time, leading to poor production efficiency. Moreover, defective products tend to be produced as a result of cutting failure in the cutting process.

The method using a template can form acute-angled and deep recess and projection shapes. However, the mat on which the template is placed has an approximately uniform thickness and an approximately flat surface, and therefore, the recesses have a high specific gravity and the projections have a low specific gravity. Due to this specific gravity difference between the recesses and the projections, cracking tends to occur in the wood cement board during a hardening and curing process, a drying process, a transportation process and so on, and a coating material is absorbed into the substrate of the wood cement board during a coating process. This results in the problems of a significant reduction in the strength, the water resistance, the freeze resistance, the weatherability and the like of the wood cement board, an increase in the amount of the coating material required, and nonuniform coating.

As one remedy for the above-described problems, there has been proposed a method in which a mat layer is formed by dispersing a raw material mixture with a plurality of partition plates placed on predetermined areas, and then removing the raw material mixture present on the partition plates, thereby forming a mat having recesses on the predetermined areas, and an upper template provided with projections corresponding to the portions on which the recesses are formed is pressed down from above the thus formed mat, followed by hardening and curing (JP 2001-150421 A).

However, the method disclosed in JP 2001-150421A requires the operation of arranging partition plates, and also the operation of removing the partition plates, and therefore has reduced production efficiency.

Moreover, there will be an extra initial cost since various partition plates need to be prepared depending on the depth, the width, and the length of the recesses. In the case of forming a pattern having a large number of recesses or a pattern having recesses of various shapes, the operation is more complicated, which results in a further reduction in the production efficiency.

Also in the case of forming recesses that have a long shape, such as those longitudinally traversing the surface of a wood cement board, or that have a wide shape, the workability is reduced and the production efficiency is poor.

The present invention has been made in order to solve the above-described problems, and it is an object of the invention to provide a high production method of the production efficiency for a wood cement board that has a pattern of recesses and projections

SUMMARY OF THE INVENTION

In order to attain the above-described object, according to this aspect of the present invention, the wood cement board that has a pattern of recesses and projections can be produced, for example, by a method for producing a wood cement board, including the steps of: dispersing a raw material mixture onto a template provided with recesses corresponding to the portions of the wood cement board on which projections are formed, while conveying the template, thereby forming a mat; pressurizing only a section of the mat raw material mixture that is layered on the recesses of the template from above; leveling the surface of the partly pressurized mat; and pressing the resulting mat and the template together, followed by hardening and curing.

In the present invention, the above during pressurizing only a section of the mat raw material mixture that is layered on the recesses of the template from above is a back side of a product after a pressing process, a hardening process, a curing process and a drying process.

A method of the pressurizing only a section of the mat raw material mixture that is layered on the recesses of the template from above is that a roll member is pushed to the raw materials mixture while conveying the template.

The width of the roll member is the generally same as recesses width of a template.

The mixing ratio of the above-described raw materials is as follows: 35 to 70 mass % of the hydraulic material, 0 to 60 mass % of the silica-containing material, and 5 to 30 mass % of the wood reinforcement.

In the above-described production method, that is all for one kind of combination of raw materials mixture, then a method for producing a wood cement board, including the steps of pressurizing only a section of the mat raw material mixture that is layered on the recesses of the template from above while conveying the template, thereby the production efficiency is rich.

In the above-described production method, the mass of the raw material mixture layered on the recesses of the template is larger than the mass of the raw material mixture layered on the projections of the template.

That is, the mass of the raw material mixture on the portions of the wood cement board on which the projections are formed is larger than the mass of the mixture on the portions on which the recesses are formed.

Accordingly, the mat can be pressed in a uniform manner, so that the specific gravities of the projections and the recesses in the pressed mat are increased to, and the specific gravity difference between the projections and the recesses is decreased.

Therefore, it is possible to prevent occurrence of cracking in the wood cement board during a hardening and curing process, a drying process, a transportation process and so on, and to achieve an improvement in terms of the absorption of a coating material into the substrate during a coating process. As a result, it is possible to prevent the problems of a reduction in the strength, the water resistance, the freeze resistance, and the weatherability of a product of the wood cement board, an increase in the amount of the coating material required, and nonuniform coating. In addition, there is a secondary effect in that the wood cement board can be produced even if the pressing capability is not so large.

According to a second aspect of the present invention, the wood cement board that has a pattern of recesses and projections can be produced, for example, by a method for producing a wood cement board, including the steps of: dispersing a surface layer raw material mixture onto a template provided with recesses corresponding to the portions of a wood cement board on which projections are formed, while conveying the template, thereby forming a surface layer mat; dispersing a core layer raw material mixture onto the surface layer mat to form a core layer mat; pressurizing only certain sections of the raw material mixtures of the core layer mat and the surface layer mat that are layered on the recesses of the template from above; leveling the surface of the partly pressurized core layer mat; further dispersing the surface layer raw material mixture onto the core layer mat whose surface has been leveled to form a surface layer mat; and pressing the resulting mat having a three-layer structure and the template, followed by hardening and curing.

In the present invention, the above during pressurizing only certain sections of the raw material mixtures of the core layer mat and the surface layer mat that are layered on the recesses of the template from above is a back side of a product after a pressing process, a hardening process, a curing process and a drying process.

A method of the pressurizing only certain sections of the raw material mixtures of the core layer mat and the surface layer mat that are layered on the recesses of the template from above is that a roll member is pushed to the raw materials mixture while conveying the template.

The width of the roll member is the generally same as recesses width of a template.

Note that, although the surface layer and the core layer each include a hydraulic material, a silica-containing material, and a wood reinforcement, they differ in composition of the raw material mixture. The surface layer has a dense structure containing fine raw materials, contains 35 to 70 mass % of a hydraulic material, 0 to 50 mass % of a silica-containing material, and a 5 to 25 mass % of a wood reinforcement, and serves to increase the strength, the water resistance and the like of the wood cement board. On the other hand, the core layer is a composition of coarse raw materials, contains 30 to 60 mass % of a hydraulic material, 0 to 60 mass % of a silica-containing material, and 10 to 30 mass % of a wood reinforcement, and serves to reduce the weight of the wood cement board. The blending ratio of the surface layer and the core layer in terms of mass is 1:1 to 1:6, preferably 1:1 to 1:4, and the thickness of the core layer is preferably larger than that of the surface layer.

In the above-described production method, a method for producing a wood cement board, including the steps of pressurizing only certain sections of the raw material mixtures of the core layer mat and the surface layer mat that are layered on the recesses of the template from above while conveying the template, thereby the production efficiency is rich.

That is, the mass of the raw material mixtures on the portions of the wood cement board on which the projections are formed is larger than the mass of the raw material mixtures on the portions on which the recesses are formed. This makes it possible to press the mat uniformly, thereby increasing the specific gravities of the projections and the recesses of the mat after pressing, and decreasing the specific gravity difference between the projections and the recesses.

Also according to this aspect of the present invention, it is possible to prevent occurrence of cracking in the wood cement board during a hardening and curing process, a drying process, a transportation process and so on, and to achieve an improvement in terms of the absorption of a coating material into the substrate during a coating process.

Moreover, a thickness of the outer layer does not further change, the surface layer makes it possible to maintain the strength, the water resistance, the freeze resistance, and the weatherability of the wood cement board, and to prevent the problems of an increase in the amount of the coating material required, and nonuniform coating. In addition, there is a secondary effect in that the wood cement board can be produced even if the pressing capability is not so large.

According to a third aspect of the present invention, the wood cement board that has a pattern of recesses and projections can be produced, for example, by a method for producing a wood cement board, including the steps of: dispersing a raw material mixture onto a pressing plate while conveying a flat surface pressing plate, thereby forming a mat; pressurizing only a section of the mat raw material mixture that is the portions on which projections are formed of the pressing plate from above; leveling the surface of the partly pressurized mat; placing on the mat the template provided with the recesses corresponding to the portions on which the projections are formed and pressing the resulting mat and the template together, followed by hardening and curing.

In the present invention, the above during pressurizing only a section of the mat raw material mixture that is the portions on which projections are formed of the pressing plate from above is a surface side of a product after a pressing process, a hardening process, a curing process and a drying process.

A method of the pressurizing a section of the mat raw material mixture that is the portions on which projections are formed of the pressing plate from above is that a roll member is pushed to the raw materials mixture while conveying the pressing plate.

The width of the roll member is the generally same as recesses width of a template.

The mixing ratio of the above-described raw materials is as follows: 35 to 70 mass % of the hydraulic material, 0 to 60 mass % of the silica-containing material, and 5 to 30 mass % of the wood reinforcement.

In the above-described production method, that is all for one kind of combination of raw materials mixture, then a method for producing a wood cement board, including the steps of pressurizing only a section of the mat raw material mixture that is the portions on which projections are formed of the pressing plate from above while conveying the pressing plate, thereby the production efficiency is rich.

That is, the mass of the raw material mixtures on the portions of the wood cement board on which the projections are formed is larger than the mass of the raw material mixtures on the portions on which the recesses are formed. This makes it possible to press the mat uniformly, thereby increasing the specific gravities of the projections and the recesses of the mat after pressing, and decreasing the specific gravity difference between the projections and the recesses.

Therefore, it is possible to prevent occurrence of cracking in the wood cement board during a hardening and curing process, a drying process, a transportation process and so on, and to achieve an improvement in terms of the absorption of a coating material into the substrate during a coating process. As a result, it is possible to prevent the problems of a reduction in the strength, the water resistance, the freeze resistance, and the weatherability of a product of the wood cement board, an increase in the amount of the coating material required, and nonuniform coating. In addition, there is a secondary effect in that the wood cement board can be produced even if the pressing capability is not so large.

According to a forth aspect of the present invention, a wood cement board that has a pattern of recesses and projections can be produced, for example, by a method for producing a wood cement board, including the steps of: dispersing a surface layer raw material mire onto a pressing plate while conveying the flat surface pressing plate, thereby forming a mat; dispersing a core layer raw material mixture onto the surface layer mat to form a core layer mat; pressurizing only certain sections of the raw material mixtures of the core layer mat and the surface layer mat that is the portions on which projections are formed of the pressing plate from above; leveling the surface of the partly pressurized core layer mat; further dispersing the surface layer raw material mixture onto the core layer mat whose surface has been leveled to form a surface layer mat; placing on the resulting mat having a three-layer structure the template provided with the recesses corresponding to the portions on which the projections are formed; and pressing the resulting mat having a three-layer structure and the template, followed by hardening and curing.

In the present invention, the above during pressurizing only certain sections of the raw material mixtures of the core layer mat and the surface layer mat that is the portions on which projections are formed of the pressing plate from above is a surface side of a product after a pressing process, a hardening process, a curing process and a drying process.

A method of the pressurizing certain sections of the raw material mixtures of the core layer mat and the surface layer mat that is the portions on which projections are formed of the pressing plate from above is that a roll member is pushed to the raw materials mixture while conveying the pressing plate.

The width of the roll member is the generally same as recesses width of a template.

Note that, although the surface layer and the core layer each include a hydraulic material, a silica-containing material, and a wood reinforcement, they differ in composition of the raw material mixture. The surface layer has a dense structure containing fine raw materials, contains 35 to 70 mass % of a hydraulic material, 0 to 50 mass % of a silica-containing material, and a 5 to 25 mass % of a wood reinforcement, and serves to increase the strength, the water resistance and the like of the wood cement board. On the other hand, the core layer is a composition of coarse raw materials, contains 30 to 60 mass % of a hydraulic material, 0 to 60 mass % of a silica-containing material, and 10 to 30 mass % of a wood reinforcement, and serves to reduce the weight of the wood cement board. The blending ratio of the surface layer and the core layer in terms of mass is 1:1 to 1:6, preferably 1:1 to 1:4, and the thickness of the core layer is preferably larger than that of the surface layer.

In the above-described production method, a method for producing a wood cement board, including the steps of pressurizing only a section of the raw material mixture that is the portions on which projections are formed of the pressing plate from above while conveying the pressing plate, thereby the production efficiency is rich.

That is, the mass of the raw material mixtures on the portions of the wood cement board on which the projections are formed is larger than the mass of the raw material mixtures on the portions on which the recesses are formed. This makes it possible to press the mat uniformly, thereby increasing the specific gravities of the projections and the recesses of the mat after pressing, and decreasing the specific gravity difference between the projections and the recesses.

Also according to this aspect of the present invention, it is possible to prevent occurrence of cracking in the wood cement board during a hardening and curing process, a drying process, a transportation process and so on, and to achieve an improvement in terms of the absorption of a coating material into the substrate during a coating process.

Moreover, a thickness of the surface layer does not further change, the surface layer makes it possible to maintain the strength, the water resistance, the freeze resistance, and the weatherability of the wood cement board, and to prevent the problems of an increase in the amount of the coating material required, and nonuniform coating. In addition, there is a secondary effect in that the wood cement board can be produced even if the pressing capability is not so large.

Accordingly, it is possible to decrease the specific gravity difference between the projections and the recesses of a wood cement board that has a pattern of recesses and projections and to achieve a sufficient strength, prevent occurrence of cracking that may possibly occur in the wood cement board during a hardening and curing process, a drying process, a transportation process and so on, and to achieve an improvement in terms of the absorption of a coating material into the substrate during a coating process. Consequently, it is also possible to prevent the problems of a reduction in the strength, the water resistance, the freeze resistance, and the weatherability of a product of the wood cement board, an increase in the amount of the coating material required, and nonuniform coating.

In addition, according to the production method of the present invention, the method for producing a wood cement board is simple and while conveying the template or the pressing plate, thereby the production efficiency is rich.

Moreover, the wood cement board that has a pattern of recesses and projections can be further pressed uniformly.

The wood cement board can be produced without big press capacity.

DETAILED DESCRIPTION OF THE INVENTION

Hereinafter, the best mode for carrying out the present invention will be specifically described with reference to FIGS. 1 to 6F.

Embodiment 1

Figure 1:
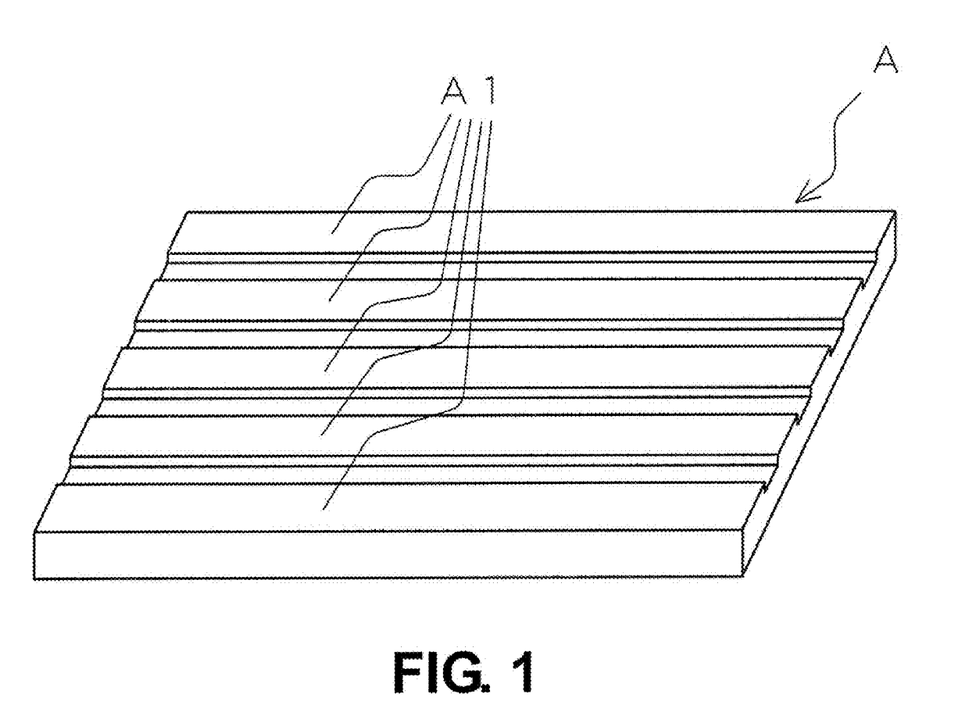
FIG. 1 is a diagram showing a wood cement board having projections on its surface.

FIG. 1 is a diagram showing an example of a wood cement board A having projections A1 on its surface. Here, five linear projections A1 extending in the longitudinal direction are formed on the surface of the wood cement board A.

Figure 2:
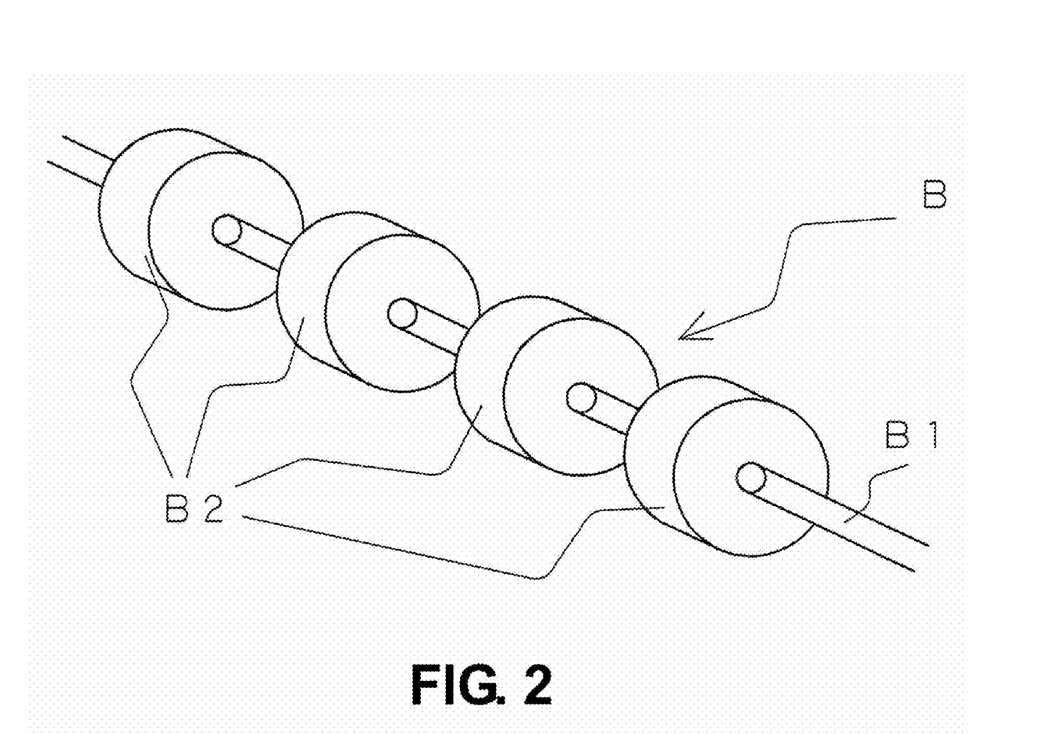
FIG. 2 is a diagram showing an example of an apparatus, used for producing the wood cement board shown in FIG. 1, that pressurizes a section of a mat raw material.

FIG. 2 is a diagram showing an example of an apparatus B, used for producing the wood cement board A shown in FIG. 1, that rotates and pressurizes a section of a mat raw material used for molding the wood cement board A. The apparatus B includes a rotating shaft B1 and a plurality of rollers B2 that are formed around the rotating shaft B1, and is placed above a conveyer for conveying a mat, in a direction orthogonal to the traveling direction of the mat. By rotation of the rotating shaft B1, the rollers B2 can be brought into pressure contact with necessary portions of the mat raw material, thereby pressurizing the mat. Note that the rollers B2 can be adjusted in operating position and height. In addition, the apparatus B can be detached from the production line. Accordingly, if an apparatus B including rollers B2 arranged and adjusted corresponding to a pattern of the recesses of a wood cement board that is to be produced, and is switched depending on the pattern of the recesses of a wood cement board that is to be produced, the production efficiency of the wood cement board can be prevented from being reduced, with excellent workability.

FIGS. 3A to 3H are schematic diagrams illustrating an example of the flow of a production process for producing the wood cement board A shown in FIG. 1 by showing the states of a mat produced in each step.

In the production process shown in FIGS. 3A to 3H, a surface layer raw material mixture E and a core layer raw material mixture F that differ in formulation are used.

Figure 3A:
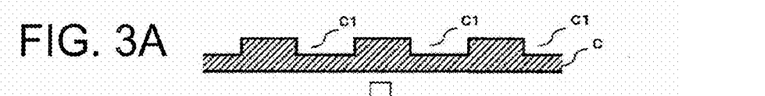
FIGS. 3A to 3H are schematic diagrams illustrating the flow of a production process for producing the wood cement board shown in FIG. 1 by showing the state of a mat produced in each step.
Figure 3B:
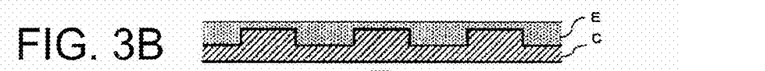

First, a template C provided with recesses C1 corresponding to portions on which projections are formed is placed on a conveyer (not shown) such that the recesses C1 of the template C face upward, as shown in FIG. 3A. While conveying the template C placed on the conveyer, the surface layer raw material mixture E is dispersed onto the entire surface of the template C to form a surface layer mat as shown in FIG. 3B. Note that raw materials having a smaller particle diameter than that of the core layer are blended in the surface layer raw material mixture E so that the surface of the resulting wood cement board is dense.

Figure 3C:
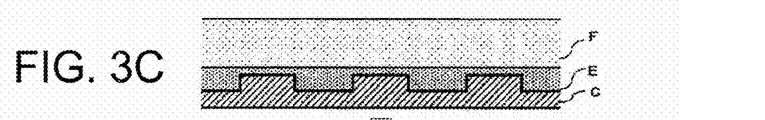
Figure 3D:
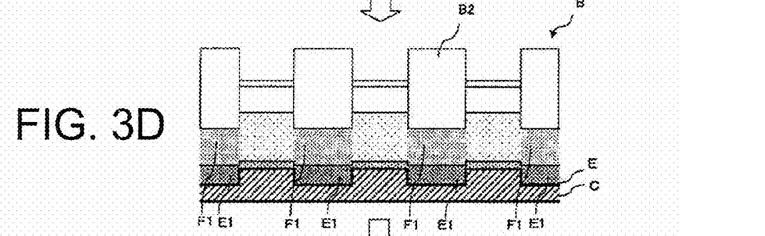
Figure 3E:
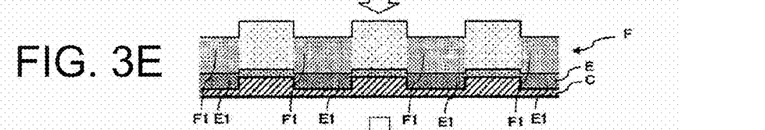
Figure 3F:
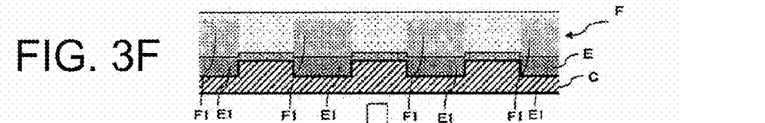

Next, while continuously conveying the template C on which the surface layer raw material mixture E is deposited, the core layer raw material mixture F is dispersed onto the entire surface of the surface layer raw material mixture E. The core layer raw material mixture F is dispersed in an amount larger than that of the surface layer raw material mixture E so that the thickness of the core layer mat is larger than that of the surface layer mat, thereby forming a core layer mat as shown in FIG. 3C. Note that, above the conveyance path, a brush (not shown) is provided so as to be lightly in contact with the surface of the core layer raw material mixture F, thereby leveling the surface of the core layer raw material mixture F. The surface leveling may be performed by blowing air. Then, the template C on which the raw material mixtures E and F are deposited is further conveyed with the conveyer, and, as shown in FIG. 3D, only certain sections of the raw material mixtures E and F that are layered on the recesses C1 of the template C are pressurized from above using the rollers B2 of the apparatus B shown in FIG. 2, which is provided above the conveyer, thereby obtaining a mat including portions E1 and F1 resulting from pressurizing only certain sections of the raw material mixtures that are layered on the recesses C1 of the template C, as shown in FIG. 3E. Then, the mat including the pressurized portions E1 and F1 is brought into light contact with the surface of the brush (not shown) provided above the conveyance path, or subjected to air blowing, while conveying the mat, thereby obtaining a mat whose surface has been leveled, as shown in FIG. 3F. Note that, in order to achieve a leveled surface, portions other than E1 and F1 that are higher than E1 and F1 may be scraped off with a brush or air (not shown) to level the surface of the mat.

Figure 3G:
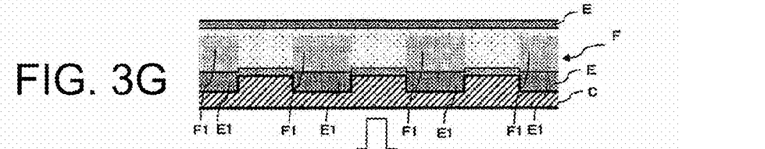
Figure 3H:
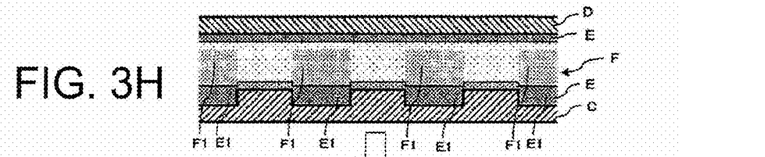

The template C on which the raw material mixtures E and F are deposited is further conveyed on the conveyer, and the surface layer raw material mixture E is dispersed again onto the entire surface of the raw material mixture F thereby forming a surface layer mat on the core layer mat, as shown in FIG. 3G. Then, as shown in FIG. 3H, a flat pressing plate D is placed on the surface of the thus obtained mat, and the mat is pressurized together with the template C, followed by hardening and curing.

The above-described production process carries out the dispersal of the raw material mixtures, the partial pressurization of the raw material mixtures, and the surface leveling of the raw material mixtures while conveying the template C, and therefore provides a good production efficiency. Furthermore, only certain sections of the raw material mixtures E and F that correspond to the recesses C1 of the template C are pressurized, and the surface of the core layer mat is leveled after the pressurization. Accordingly, a uniform load is applied to the mat during pressing, so that it is possible to produce the wood cement board even if the pressing capability is not so large, and to decrease the specific gravity difference between the recesses and the projections on the surface of the wood cement board A, thereby achieving an improvement in terms of the occurrence of cracking in the wood cement board A and of the absorption of a coating material into the substrate. Furthermore, since the amount of the raw material mixture E in the surface layer remains unchanged, it is possible to maintain the strength, the water resistance, the freeze resistance, and the weatherability of the wood cement board A, and to prevent the problems of an increase in the amount of the coating material required, and nonuniform coating.

FIGS. 4A to 4H are schematic diagrams illustrating another example of the flow of a production process for producing the wood cement board A shown in FIG. 1 by showing the state of a mat produced in each step.

Figure 4A:
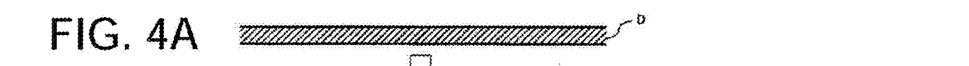
FIGS. 4A to 4H are schematic diagrams illustrating another example of the flow of a production process for producing the wood cement board shown in FIG. 1 by showing the state of a mat produced in each step.
Figure 4B:
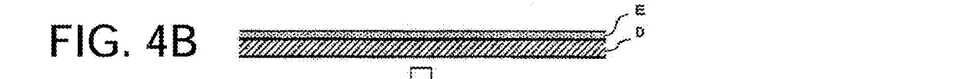
Figure 4C:
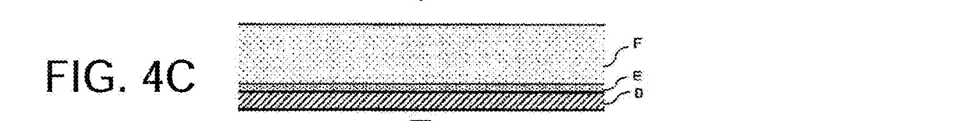
Figure 4D:
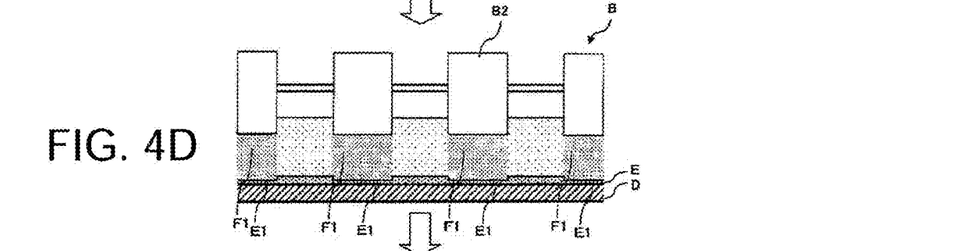
Figure 4E:
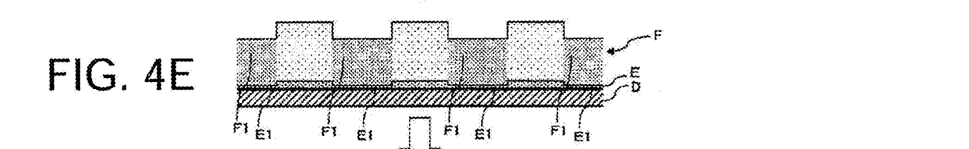
Figure 4F:
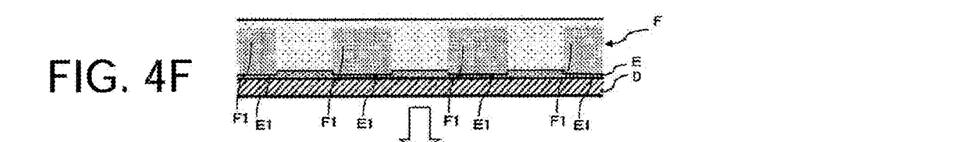
Figure 4G:
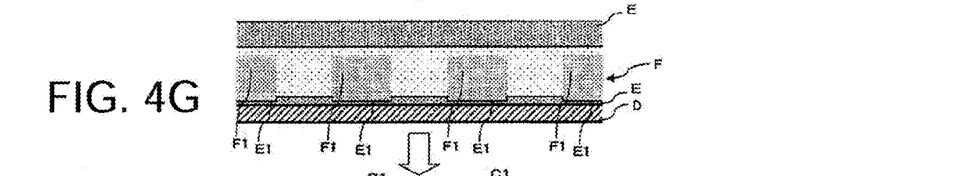
Figure 4H:
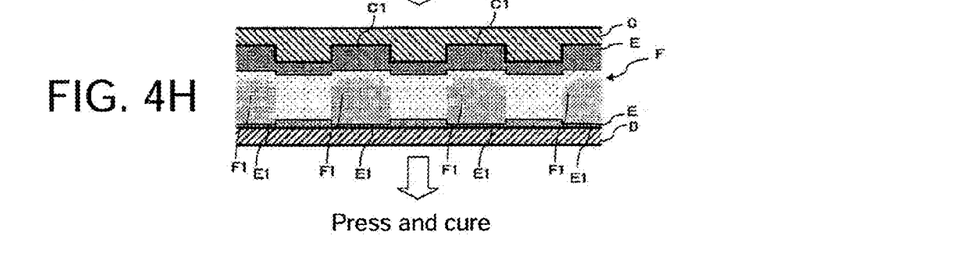

The production process shown in FIGS. 4A to 4H is the same as the production process shown in FIGS. 3A to 4H in that the surface layer and the core layer differ in formulation and thickness of the raw material mixture used and the surface layer raw material mixture E and the core layer raw material mixture F are used, the core layer raw material mixture F is dispersed onto the surface layer raw material mixture E, the core layer mat has a thickness larger than that of the surface layer mat, only certain sections of the raw material mixtures E and F that correspond to the recesses C1 of the template C are pressurized using the apparatus B shown in FIG. 2, which is provided above the conveyer, thereby producing a mat including the pressurized portions E1 and F1, and the surface of the mat including the pressurized portions E1 and F1 is leveled before dispersing the surface layer raw material mixture E onto the entire surface of the raw material mixture F, followed by pressing, and hardening and curing. However, the production process shown in FIGS. 4A to 4H differs from the production process shown in FIGS. 3A to 3H in that the flat pressing plate D is placed on the conveyer first, as shown in FIG. 4A, the dispersal of the raw material mixtures, the partial pressurization of the raw material mixtures, and the surface leveling of the raw material mixtures are carried out while conveying the flat pressing plate D, as shown in FIGS. 4B to 4G, and the template C provided with the recesses C1 corresponding to the portions on which the projections are formed is placed on a mat having a three-layer structure, as shown in FIG. 4H. Note that the template C is placed on the mat with the recesses C1 facing downward, and the pressurized positions correspond with the positions of the recesses C1.

The above-described production process also carries out the dispersal of the raw material mixtures, the partial pressurization of the raw material mixtures, and the surface leveling of the raw material mixtures while conveying the pressing plate D, and therefore provides a good production efficiency as with the production method shown in FIGS. 3A to 3H.

Furthermore, only certain sections of the raw material mixtures E and F that correspond to the recesses C1 of the template C are pressurized, and the surface of the core layer mat is leveled after the pressurization. Accordingly, a uniform load is applied to the mat during pressing, so that it is possible to produce the wood cement board even if the pressing capability is not so large, and to decrease the specific gravity difference between the recesses and the projections on the surface of the wood cement board A, thereby achieving an improvement in terms of the occurrence of cracking in the wood cement board A and of the absorption of a coating material into the substrate. Furthermore, since the amount of the raw material mixture E in the surface layer remains unchanged, it is possible to maintain the strength, the water resistance, the freeze resistance, and the weatherability of the wood cement board A, and to prevent the problems of an increase in the amount of the coating material required, and nonuniform coating.

FIGS. 5A to 5F are schematic diagrams illustrating another example of the flow of a production process for producing the wood cement board A shown in FIG. 1 by showing the state of a mat produced in each step.

The production method shown in FIGS. 5A to 5H uses a single formulation of a raw material mixture, i.e., only a raw material mixture G.

Figure 5A:
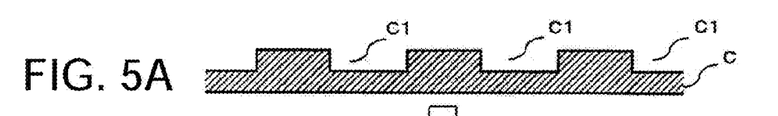
FIGS. 5A to 5F are schematic diagrams illustrating yet another example of the flow of a production process for producing the wood cement board shown in FIG. 1 by showing the state of a mat produced in each step.
Figure 5B:
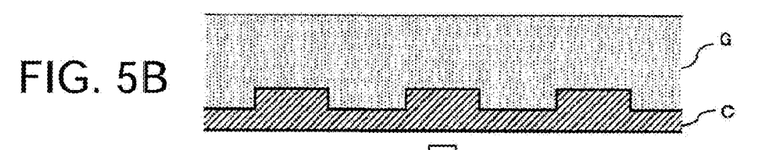
Figure 5C:
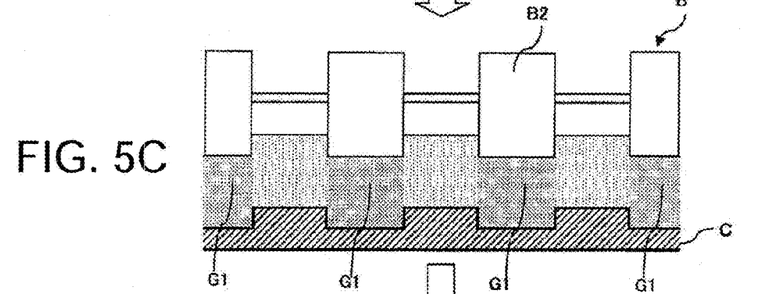
Figure 5D:
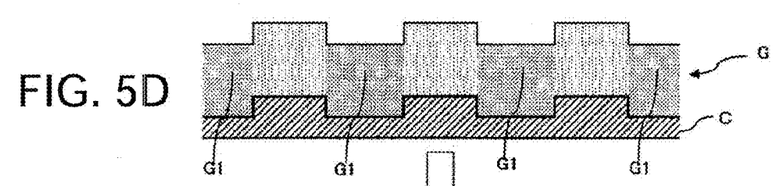
Figure 5E:
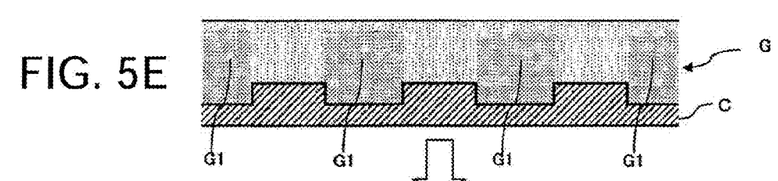
Figure 5F:
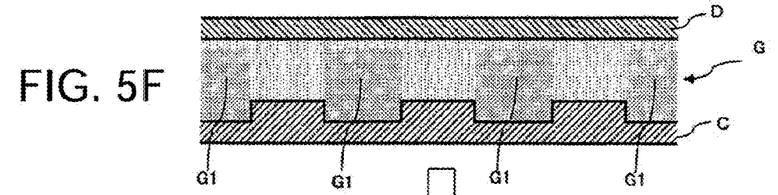

First, a template C provided with recesses C1 corresponding to the portions on which projections are formed is placed on a conveyer such that the recesses C1 of the template C face upward as shown in FIG. 5A. Next, the raw material mixture G is dispersed onto the entire surface of the template C placed on the conveyer while conveying the template C, thereby forming a mat as shown in FIG. 5B. Note that, above the conveyance path, a brush (not shown) is provided so as to be lightly in contact with the surface of the raw material mixture G, thereby leveling the surface of the raw material mixture G. The surface leveling may be performed by blowing air. Then, the template C on which the raw material mixture G is layered is further conveyed on the conveyer, and only a section of the mat raw material mixture G that is layered on the recesses C1 of the template C is pressurized from above using the rollers B2 of the apparatus B shown in FIG. 2, which is provided above the conveyer, thereby obtaining a mat including portions G1 resulting from pressurizing only a section of the raw material mixture that is layered on the recesses C1 of the template C, as shown in FIG. 5D. Then, the mat including the pressurized portions G1 is brought into light contact with the surface of a brush (not shown) provided above the conveyance path in the conveyance direction, or subjected to air blowing, thereby leveling the surface as shown in FIG. 5E. Thereafter, as shown in FIG. 5F, a pressing plate D having a flat surface is placed on the resulting mat, and the mat is pressed together with the template C, followed by hardening and curing. Note that, in order to achieve a leveled surface, portions other than G1 that are higher than G1 may be scraped off with a brush or air (not shown) to level the surface of the mat.

The above-described production process carries out the dispersal of the raw material mixture, the partial pressurization of the raw material mixture, and the surface leveling of the raw material mixture while conveying the template C, and uses only a single formulation of a raw material mixture, and it therefore provides a better production efficiency than that of the production processes shown in FIGS. 3A to 3H, and 4A to 4H. Additionally only a section of the raw material mixture G that corresponds to the recesses C1 of the template C is pressurized, and the surface of the mat is leveled after the pressurization. Accordingly, as with the production processes shown in FIGS. 3A to 3H, and 4A to 4H, a uniform load is applied to the mat during pressing, so that it is possible to produce the wood cement board even if the pressing capability is not so large, and to decrease the specific gravity difference between the recesses and the projections on the surface of the wood cement board A, thereby achieving an improvement in terms of the occurrence of cracking in the wood cement board A and of the absorption of a coating material into the substrate. Furthermore, as with the production processes shown in FIGS. 3A to 3H and 4A to 4H, it is possible to maintain the strength, the water resistance, the freeze resistance, and the weatherability of the wood cement board A, and to prevent the problems of an increase in the amount of the coating material required, and nonuniform coating.

FIGS. 6A to 6F are schematic diagrams illustrating yet another example of the flow of a production process for producing the wood cement board A shown in FIG. 1 by showing the state of a mat produced in each step.

Figure 6A:
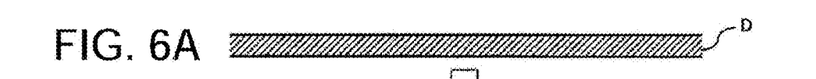
FIGS. 6A to 6F are schematic diagrams illustrating a further example of the flow of a production process for producing the wood cement board shown in FIG. 1 by showing the state of a mat produced in each step.
Figure 6B:
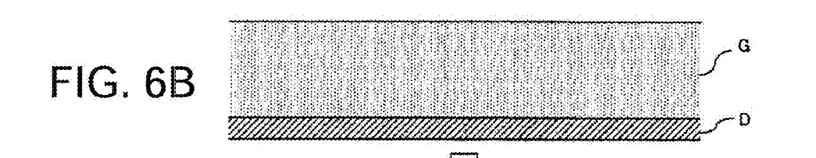
Figure 6C:
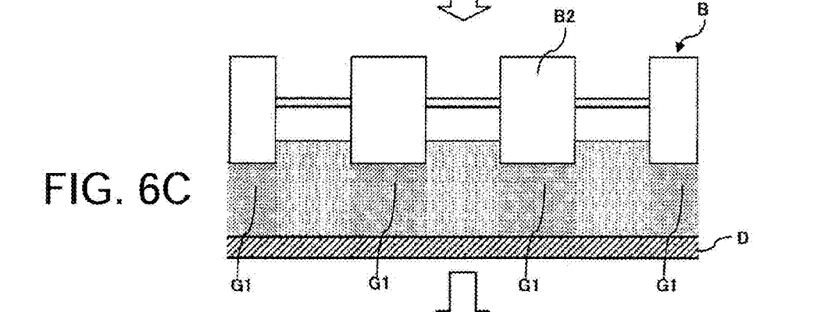
Figure 6D:
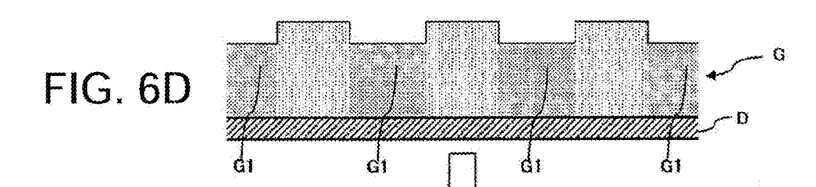
Figure 6E:
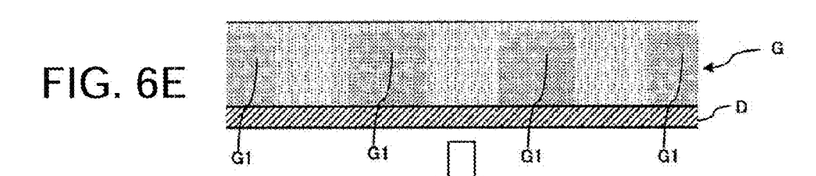
Figure 6F:
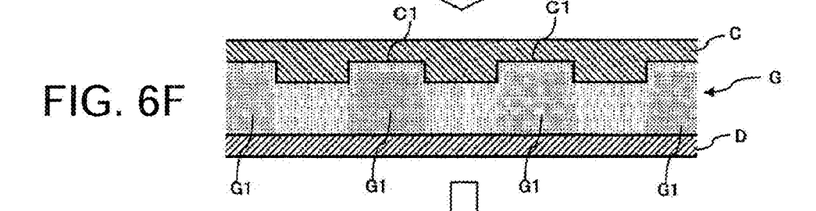

The production process shown in FIGS. 6A to 6F is the same as the production process shown in FIGS. 5A to 5F in that it uses a single formulation of a raw material mixture, i.e., only the raw material mixture G, the raw material mixture G is dispersed during conveyance on the conveyer, only a section of the mat raw material mixture G that corresponds to the recesses C1 of the template C is pressurized from above using the rollers B2 of the apparatus B shown in FIG. 2, which is provided above the conveyer, thereby producing a mat including the pressurized portions G1, and the surface of the mat including the pressurized portions G1 is leveled before pressing, and hardening and curing. However, the production process shown in FIGS. 6A to 6F differs from the production method shown in FIGS. 5A to 5F in that the raw material mixture G is dispersed onto the pressing plate D first, as shown in FIG. 6A, the dispersal of the raw material mixture, the partial pressurization of the raw material mixture, and the surface leveling of the raw material mixture are carried out while conveying the flat pressing plate D, as shown in FIGS. 6B to 6E, and the template C provided with the recesses C1 corresponding to the portions on which the projections are formed is placed on the mat, as shown in FIG. 6F. Note that the template C is placed on the mat with the recesses C1 facing downward, and the pressurized positions coincide with the positions of the recesses C1.

The above-described production process carries out the dispersal of the raw material mixture, the partial pressurization of the raw material mixture, and the surface leveling of the raw material mixture while conveying the pressing plate D, and uses only a single formulation of a raw material mixture, and it therefore provides a good production efficiency as with the production processes shown in FIGS. 5A to 5F. Additionally, only a section of the raw material mixture G that corresponds to the recesses C1 of the template C is pressurized, and the surface of the mat is leveled after the pressurization. Accordingly, as with the production processes shown in FIGS. 3A to 3H, 4A to 4H, and 5A to 5F, a uniform load is applied to the mat during pressing, so that it is possible to produce the wood cement board even if the pressing capability is not so large, and to decrease the specific gravity difference between the recesses and the projections on the surface of the wood cement board A, thereby achieving an improvement in terms of the occurrence of cracking in the wood cement board A and of the absorption of a coating material into the substrate. Furthermore, as with the production processes shown in FIGS. 3A to 3H, 4A to 4H, and 5A to 5F, it is possible to maintain the strength, the water resistance, the freeze resistance, and the weatherability of the wood cement board A, and to prevent the problems of an increase in the amount of the coating material required, and nonuniform coating.

It should be appreciated that the present invention is not limited to the above-described embodiment.

In the production processes shown in FIGS. 3A to 3H, and 4A to 4H, the surface layer raw material mixture E provided on the front side and the surface layer raw material mixture E provided on the rear side may have different formulations, or the surface layer raw material mixture E may not be provided on the rear side.

Figure 7:
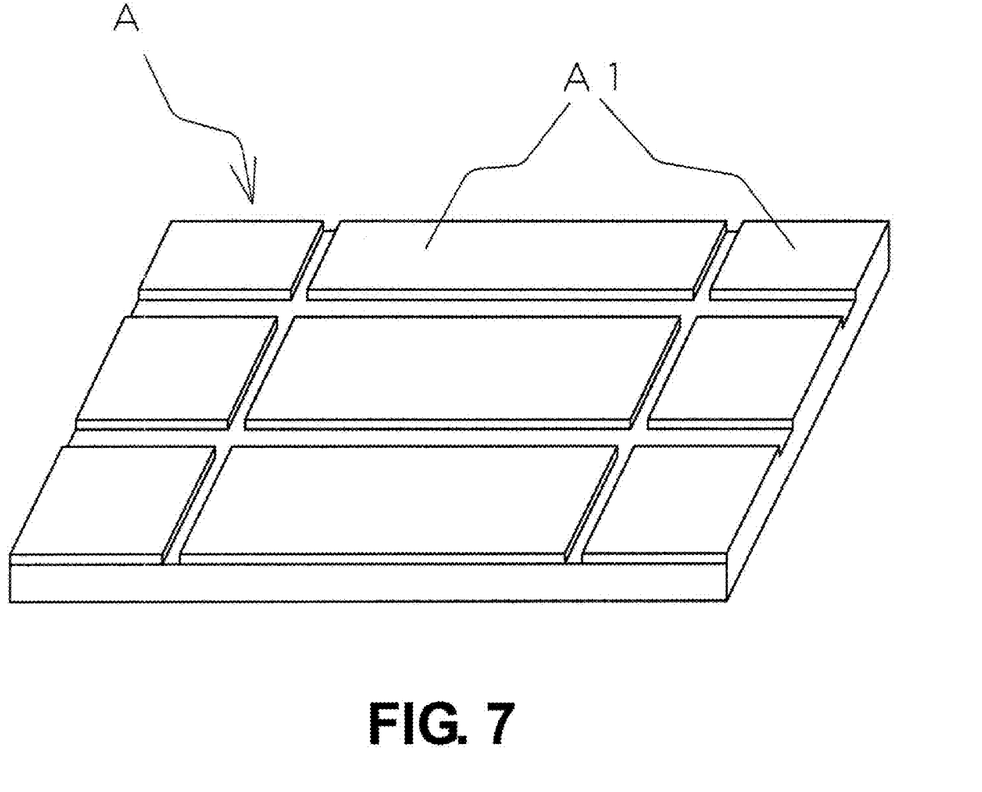
FIG. 7 is a diagram showing a wood cement board having recesses on its surface in two directions.

When the recesses are formed in two orthogonal directions as shown in FIG. 7, it is possible to form a mat having recesses in two directions by providing two conveyers for performing the longitudinal conveyance and the transverse conveyance, and placing the apparatus B shown in FIG. 2 above each of the conveyers.

Furthermore, 5 mass % of aluminum sulfate as a hardening accelerator was externally added to a raw material mixture containing 40 mass % of portland cement as a hydraulic material, 38 mass % of silica sand as a silica-containing material, and 11 mass % of wood chip and 11 mass % of pulp as wood reinforcements. Using the resulting raw material mixture, a wood cement board as shown in FIG. 1 was produced by the wood cement board production process shown in FIGS. 5A to 5E The obtained wood cement board was subjected to autoclave curing at 165° C. under 6 kgf/cm$^2$ for six hours, thereby obtaining Example 1, which was a wood cement board composed of a single layer and having an overall thickness of 16 mm. Note that, in the wood cement board, the distance from the apex of the projections to the base point of the recesses was set to 4 mm in order to form acute-angled and deep recess and projection shapes. The pressing pressure applied to the mat and the template for the wood cement board to have an overall thickness of 16 mm was 45 kgf/cm$^2$.

As another example, 5 mass % of aluminum sulfate as a hardening accelerator was externally added to a raw material mixture containing 38 mass % of portland cement as a hydraulic material, 38 mass % of silica sand as a silica-containing material, 24 mass % of pulp as a wood reinforcement, to prepare a surface layer raw material mixture. Meanwhile, 3 mass % of aluminum sulfate as a hardening accelerator was externally added to a raw material mixture containing 40 mass % of portland cement as a hydraulic material, 40 mass % of silica sand as a silica-containing material, and 20 mass % of wood chip as a wood reinforcement to prepare a core layer raw material mixture. Using these raw material mixtures, a wood cement board as shown in FIG. 1 was produced by the wood cement board production process shown in FIGS. 3A to 3H. The wood cement board was subjected to autoclave curing at 165° C. under 6 kgf/cm$^2$ for six hours, thereby obtaining Example 2, which was a wood cement board composed of three layers and having a thickness of 16 mm. Note that the blending ratio in terms of mass of the surface layer and the core layer was 1:4, and the distance from the apex of the projections to the base point of the recesses was set to 4 mm also for this wood cement board. In Example 2, the pressing pressure applied to the mat and the template for the wood cement board to have an overall thickness of 16 mm as with Example 1 was 45 kgf/cm$^2$.

Further, for comparison with Example 1, Comparative Example 1, which was composed of a single layer, was obtained in the same manner as in the production method of Example 1, except for omitting pressurizing only a section of the raw material mixture that is layered on the recesses of the template from above, and leveling the surface of the partly pressurized mat. In Comparative Example 1, the pressing pressure applied to the mat and the template for the wood cement board to have an overall thickness of 16 mm as with Example 1 was 50 kgf/cm².

Further, for comparison with Example 2, Comparative Example 2, which was composed of three layers, was obtained in the same manner as in the production method of Example 2, except for omitting pressurizing only a section of the raw material mixture that is layered on the recesses of the template from above, and leveling the surface of the partly pressurized mat. In Comparative Example 2, the pressing pressure applied to the mat and the template for the wood cement board to have an overall thickness of 16 mm as with Example 2 was 50 kgf/cm².

For Examples 1 and 2 and Comparative Examples 1 and 2 described above, the average specific gravity of each of the wood cement boards as a whole, the specific gravities of the projections and the recesses, as well as the surface water absorption and the bending strength of each of the wood cement boards were measured, and the results are shown in Table 1. The bending strength was measured in accordance with JIS A 1408 using test samples of 500×400 mm. The surface water absorption was measured by a frame placement method in which a frame of 0.2×0.2 m was provided on the surface of a coated plate, and the coated plate was stood still for 24 hours, with a certain amount of water placed within the frame. The change in mass of the coated plate before and after the measurement was calculated using Formula (1), and shown as the surface water absorption.

$$\frac{\text{Mass (g) after measurement (after 24 hours)} - \text{Initial mass (g)}}{0.2 \times 0.2 (\text{frame area: m}^2)} \quad (1)$$

TABLE 1

|  |  |  | Ex. 1 | Ex. 2 | Com. Ex. 1 | Com. Ex. 2 |
| --- | --- | --- | --- | --- | --- | --- |
| raw material (mass %) | single layer | portland cement | 40% | — | 40% | — |
|  |  | silica sand | 38% | — | 38% | — |
|  |  | wood chip | 11% | — | 11% | — |
|  |  | pulp | 11% | — | 11% | — |
|  |  | aluminum sulfate (externally added) | 5% | — | 5% | — |
|  | surface layer | portland cement | — | 38% | — | 38% |
|  |  | silica sand | — | 38% | — | 38% |
|  |  | pulp | — | 24% | — | 24% |
|  |  | aluminum sulfate (externally added) | — | 5% | — | 5% |
|  | core layer | portland cement | — | 40% | — | 40% |
|  |  | silica sand | — | 40% | — | 40% |
|  |  | wood chip | — | 20% | — | 20% |
|  |  | aluminum sulfate (externally added) | — | 3% | — | 3% |
| pressing physical properties | surface pressure (kgf/cm²) |  | 45 | 45 | 50 | 50 |
|  | average specific gravity of wood cement board as a whole |  | 1.15 | 1.16 | 1.06 | 1.08 |
|  | specific gravity of projections of wood cement board |  | 1.12 | 1.14 | 1.00 | 1.00 |
|  | specific gravity of recesses of wood cement board |  | 1.18 | 1.19 | 1.15 | 1.16 |
|  | surface water absorption (g/m²) |  | 800 | 700 | 1800 | 1500 |
|  | bending strength (N/mm²) |  | 13 | 14 | 10 | 11 |

As shown in Table 1, in Examples 1 and 2, the average specific gravity of the wood cement board as a whole, and the specific gravities of the projections and the recesses were 1.1 or more, and the difference between the specific gravity of the projections and the specific gravity of the recesses is less than 0.1. Therefore, Examples 1 and 2 are excellent in terms of the surface water absorption and the bending strength. However, in Comparative Examples 1 and 2, the average specific gravity of the wood cement board as a whole, and the specific gravities of the projections and the recesses were less than 1.1, and the difference between the specific gravity of the projections and the specific gravity of the recesses is greater than 0.1. Therefore, Comparative Examples 1 and 2 are inferior to Examples 1 and 2 in terms of the surface water absorption and the bending strength.

Additionally, wood cement boards with an overall thickness of 8 mm in which the distance from the apex of the projections to the base point of the recesses was 4 mm were produced in the same manner as in the production methods of Examples 1 and 2. The wood cement boards were broken during conveyance, and exhibited poor strength.

Furthermore, wood cement boards in which the distance from the apex of the projections to the base point of the recesses was 1 mm were produced in the same manner as in the production methods of Examples 1 and 2. The wood cement boards exhibited approximately the same level of physical properties as those of Examples 1 and 2, but the recesses and the projections were not observed to be acute-angled, and therefore had a poor design quality.

Accordingly, it is possible to decrease the specific gravity difference between the projections and the recesses of a wood cement board that has a pattern of recesses and projections and to provide a sufficient strength, prevent cracking that may occur in the wood cement board during a hardening and curing process, a drying process, a transportation process and so on, and to achieve an improvement in terms of the absorption of a coating material into the substrate during a coating process. Consequently, it is also possible to prevent the problems of a reduction in the strength, the water resistance, the freeze resistance, and the weatherability of a product of the wood cement board, an increase in the amount of the coating material required, and nonuniform coating.

In addition, according to the production method of the present invention, the method for producing a wood cement board is simple and while conveying the template or the pressing plate, thereby the production efficiency is rich.

Moreover, the wood cement board that has a pattern of recesses and projections can be further pressed uniformly.

The wood cement board can be produced without big press capacity.

What is claimed is:

1. A method for making a wood cement board having a pattern of recesses and projections on its surface, comprising:
    dispersing a raw material mixture onto a template provided with recesses corresponding to a portion of the wood cement board on which the projections are formed, while conveying the template, thereby forming a mat;
    pressurizing only certain sections of the raw material mixture that is layered on the recesses of the template from above;
    leveling a surface of a partly pressurized mat; and
    pressing a resulting mat and the template together, followed by hardening and curing.

2. A method for making a wood cement board having a pattern of recesses and projections on its surface, comprising:
    dispersing a surface layer raw material mixture onto a template provided with recesses corresponding to a portion of the wood cement board on which the projections are formed, while conveying the template, thereby forming a surface layer mat;
    dispersing a core layer raw material mixture onto the surface layer mat to form a core layer mat;
    pressurizing only certain sections of raw material mixtures of the core layer mat and the surface layer mat that are layered on the recesses of the template from above;
    leveling a surface of a partly pressurized core layer mat;
    further dispersing the surface layer raw material mixture onto the core layer mat whose surface has been leveled to form a surface layer mat; and
    pressing a resulting mat having a three-layer structure and the template, followed by hardening and curing.

3. A method for making a wood cement board having a pattern of recesses and projections on its surface, comprising:
    dispersing a raw material mixture onto a flat surface pressing plate while conveying the flat surface pressing plate, thereby forming a mat;
    pressurizing only certain sections of the raw material mixture that is a portion on which the projections are formed of the flat surface pressing plate from above;
    leveling a surface of a partly pressurized mat;
    placing on the mat a template provided with recesses corresponding to a portion on which the projections are formed; and
    pressing a resulting mat and the template together, followed by hardening and curing.

4. A method for making a wood cement board having a pattern of recesses and projections on its surface, comprising:
    dispersing a surface layer raw material mixture onto a flat surface pressing plate while conveying the flat surface pressing plate, thereby forming a mat;
    dispersing a core layer raw material mixture onto a surface layer mat to form a core layer mat;
    pressurizing only certain sections of raw material mixtures of the core layer mat and the surface layer mat that is a portion on which the projections are formed of the flat surface pressing plate from above;
    leveling a surface of a partly pressurized core layer mat;
    further dispersing the surface layer raw material mixture onto the core layer mat whose surface has been leveled to form a surface layer mat;
    placing on a resulting mat having a three-layer structure and a template provided with recesses corresponding to a portion on which the projections are formed; and
    pressing the resulting mat having the three-layer structure and the template, followed by hardening and curing.

* * * * *